United States Patent [19]

Maxwell

[11] Patent Number: 4,835,555
[45] Date of Patent: May 30, 1989

[54] FILM TRANSPORT APPARATUS

[75] Inventor: Ian Maxwell, Oakville, Canada

[73] Assignee: Imax Systems Corporation, Toronto, Canada

[21] Appl. No.: 106,832

[22] Filed: Oct. 13, 1987

[51] Int. Cl.⁴ .......................... G03B 1/22; G03B 1/48
[52] U.S. Cl. .................................... 352/194; 352/225; 352/227
[58] Field of Search ................ 352/225, 221, 227, 194

[56] References Cited

U.S. PATENT DOCUMENTS

| 2,192,692 | 3/1940 | Nerwin | 352/221 |
| 3,776,626 | 12/1973 | Lewis | 352/194 |
| 3,914,035 | 10/1975 | Satterfield | 352/225 |

FOREIGN PATENT DOCUMENTS

| 33497 | 5/1928 | France | 352/225 |
| 660268 | 2/1929 | France | 352/225 |

Primary Examiner—Monroe H. Hayes
Attorney, Agent, or Firm—Rogers, Bereskin & Parr

[57] ABSTRACT

A film transport mechanism for an optical printer in which the film is positively clamped and laterally tensioned at the position of the aperture between each film advance step, so that the film lies absolutely flat in the focal plane of the lens system of the printer during exposure. This is achieved by providing registration pins and a pressure pad at one side of the film and a curved blade at the other side that move towards and clamp the film. The blade progressively tensions the film laterally against the pressure pad and registration pins.

17 Claims, 10 Drawing Sheets

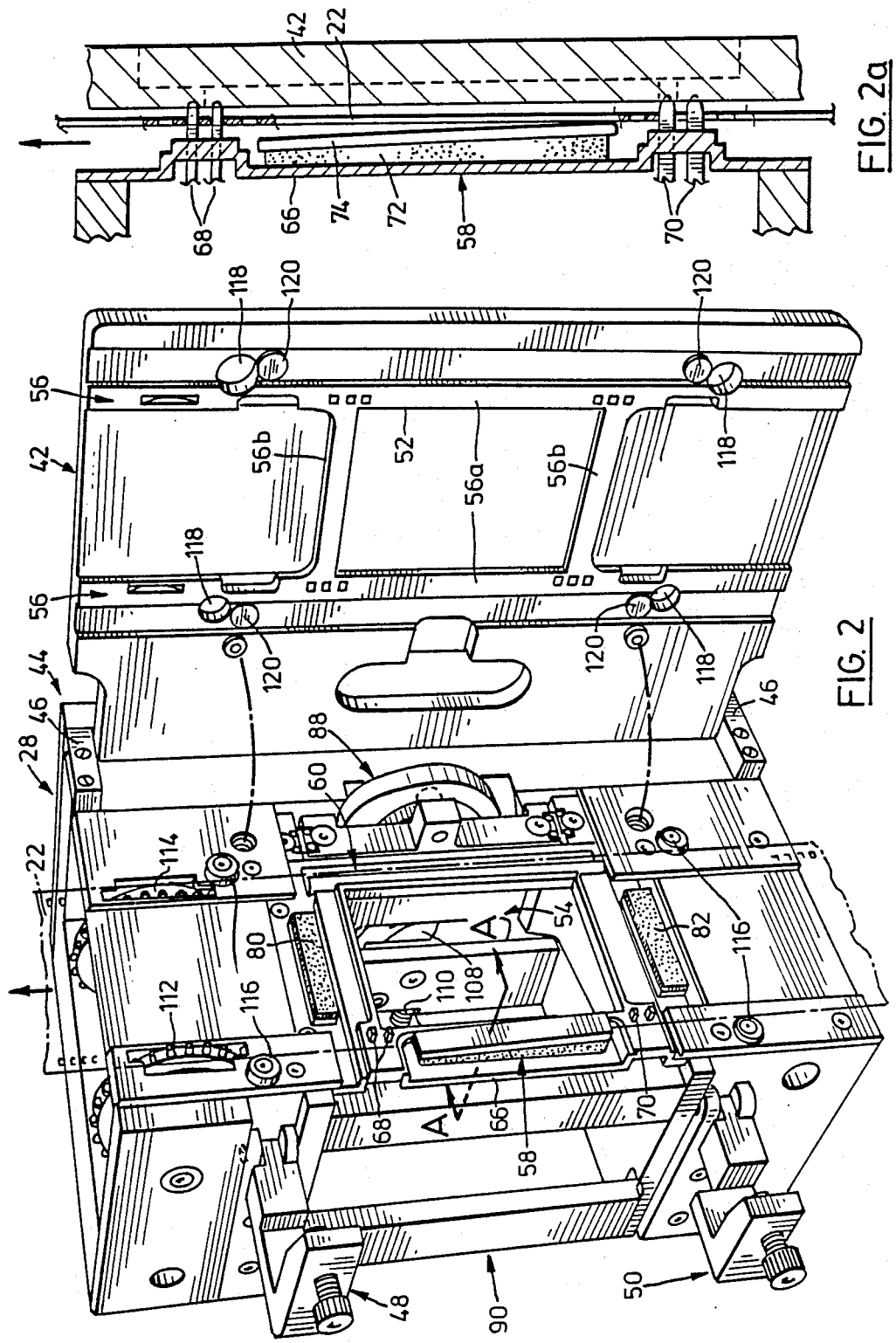

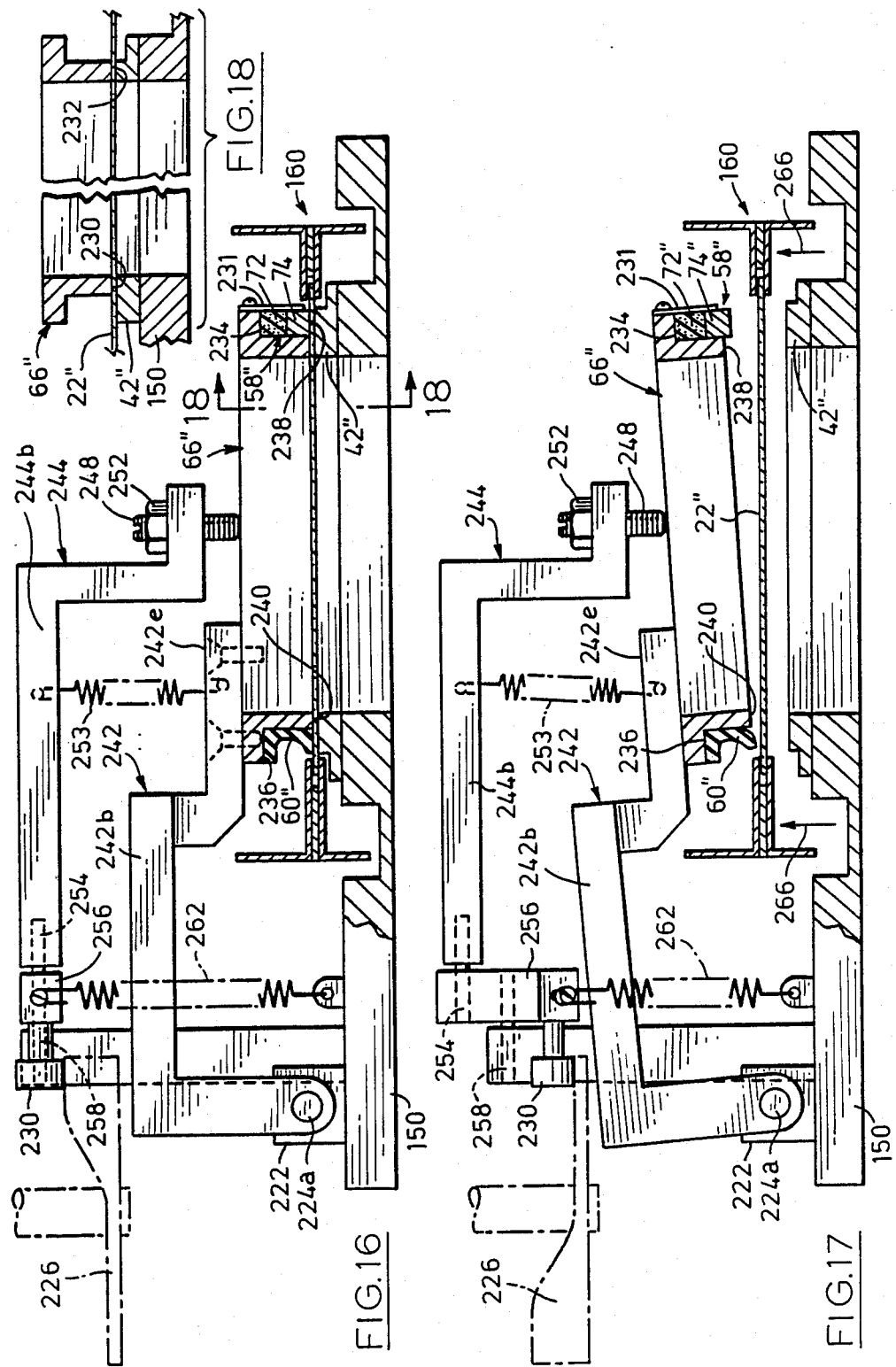

FILM TRANSPORT APPARATUS

FIELD OF THE INVENTION

This invention relates generally to optical film transport apparatus for cameras, projectors, optical printers and the like. More specifically, the invention is concerned with the location or registration of successive frames of a film with the "aperture" through which the film is exposed or projected (as the case may be), in an apparatus of this type.

BACKGROUND OF THE INVENTION

The invention has been devised primarily (but not exclusively) in connection with optical printers used to make duplicate prints of a film from a masters. An optical printer typically includes at least one projection head through which the master film is indexed frame by frame, a camera loaded with unexposed film onto which the frames are to be copied, and a light source for projecting successive frames of the master onto the film in the camera, through suitable lenses. The projection head includes a film transport mechanism which brings successive frames of the master into registration with an aperture for projection. The film in the camera is usually advanced in synchronism with the film in the projection head.

For accurate duplication of the images on the master film, it is important that the film be accurately located for projection of each frame, not only laterally with respect to the aperture but also along the projection axis (i.e. towards and away from the aperture). The film should lie flat precisely in the focal plane of the projection lens if the image is to be sharply in focus and precisely the correct size on the film in the camera. This is particularly important in the case of large format films such as those used with IMAX (registered trade mark) film projection systems.

DESCRIPTION OF THE PRIOR ART

Conventional practice in an optical printer is to locate the film laterally with respect to the projection aperture by means of registration pins that engage in the rows of perforations normally provided along both film margins. Generally, it has been thought sufficient to locate the film along the projection axis by means of spring shoes over which the film runs and by which the film is pressed against a plate in which the aperture is formed. As far as is known, in commercial projectors, alternate attempts have not been made to ensure that the film lies perfectly flat.

Some proposals for tensioning film are however shown in patent literature. For example, U.S. Pat. No. 2,192,692 (Nerwin) shows tensioning of a film by pins or teeth mounted on a leaf spring that is flattened to move the pins outwardly and tension the film. Pads or plates which engage the film for flattening and stretching purposes are shown in several U.S. patents including U.S. Pat. No. 1,728,670 (Dina) and U.S. Pat. No. 3,271,099 (Debrie). U.S. Pat. No. 2,075,753 (Weiss) shows the use of felt pads around the aperture of a movie projector for preventing the propagation of fire. Pressure pads or bars for engaging the film are shown in U.S. Pat. No. 1,037,325 (Roebuck) and in U.S. Pat. No. 1,308,443 (O'Hara). The use of grooves in film guide members for drawing the film taut is shown in Wenderhold (U.S. Pat. No. 1,373,925).

An object of the present invention is to provide a film transport apparatus having improved means for laterally tensioning and holding the film flat at the aperture.

SUMMARY OF THE INVENTION

The invention provides a film transport apparatus including a stationary aperture plate against which successive portions of a film are to be located for registration of frames on the film with an aperture in a plate, film advance means for engaging and intermittently advancing the film in steps to bring successive said frames into registration with the aperture, the film remaining stationary between steps, and film clamping means arranged to hold the stationary film against the aperture plate between each film advance step. The film clamping means includes first and second means for engaging portions of the film at opposite sides of each successive frame outwardly of the aperture, and means supporting the first and second film engaging means for progressive movement from a position clear of the film to a film clamping position. The first of the film engaging means is adapted to progressively tension the film across the aperture in moving towards the film clamping position while the second film engaging means resists lateral movement of the film under the tensioning effect of the first film engaging means.

In a preferred embodiment of the invention, the second film engaging means takes the form of a resilient pressure pad and the first film engaging means is a resilient blade extending generally parallel to the pressure pad. The blade includes a portion of arcuate shape in cross-section that terminates in an outer edge for initial frictional engagement with the film. The arcuate portion of the blade curves towards the edge in a direction away from the pressure pad so that continued movement of the blade towards the film clamped position following initial engagement of the film by the blade tensions the film between the pressure pad and the blade.

In operation, the film advance means intermittently advances the film in steps and holds the film stationary between steps as is conventional. Each time the film become stationary, the film is clamped to the aperture plate. This is accomplished by progressively moving the pressure pad and blade towards the film. The blade is arcuately shaped to curve away from the pressure pad towards its outer edge so that it tends to tension the film in a direction away from the pressure pad and thereby ensure that the film is held perfectly flat against the pressure plate. Where the film transport apparatus forms part of an optical printer, the film will be held flat in the focal plane of the projection lenses so that the image in the film will be perfectly in focus on the unexposed film in the camera.

For some special applications, it may be necessary to advance two films in surface contact with one another or one film and a mask. In that case, the blades may be carried by both the aperture plate and the pressure pad support means for simultaneously tensioning both films or the film and mask as the case may be, as will be described later.

BRIEF DESCRIPTION OF THE DRAWINGS

In order that the invention may be more clearly understood, reference will now be made to the accompanying drawings which illustrate particular preferred embodiments by way of example and in which:

FIG. 2 is a perspective view of the projection head of the printer of FIG. 1 shown with the projection "gate" open;

FIG. 2a is a vertical sectional view on line A—A of FIG. 2 with the projection gate closed;

FIG. 16 is a sectional view on line 16—16 of FIG. 15 showing the clamping means in a position for clamping film;

FIG. 17 is a view similar to FIG. 16 showing the clamping means as having released the film for permitting film advance; and, FIG. 18 is a sectional view on line 18—18 of FIG. 16.

DESCRIPTION OF THE PREFERRED EMBODIMENTS

Figure 1:
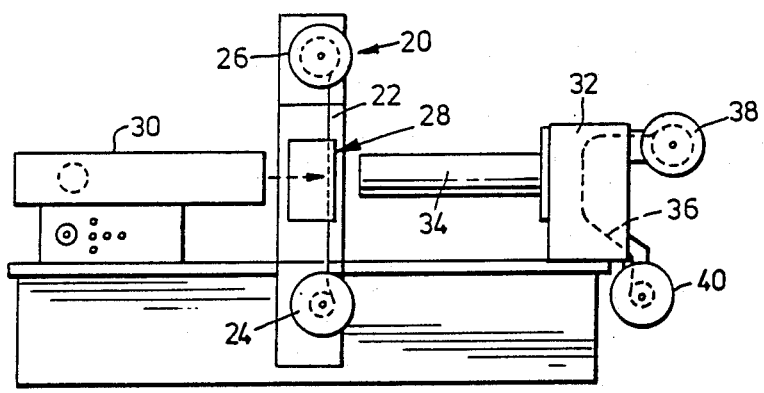
FIG. 1 is a schematic side elevational view of an optical printer incorporating a film transport apparatus in accordance with a first embodiment of the invention, the apparatus including a sprocket type film advance mechanism.

Referring first to FIG. 1, an optical printer is shown to comprise a projection head 20 through which a master film 22 is advanced between reels 24 and 26 by a film transport apparatus or mechanism 28. A light source 30 at one side of the projection head projects successive images from the master film 22 into a camera 32 through a suitable lens 34. Camera 32 contains an unexposed film 36 that is advanced between reels 38 and 40 in synchronism with the movement of the master film 22 by the film transport mechanism 28. The light source 30, camera 32 and lens 34 form no part of the present invention and will therefore not be described in detail.

FIG. 2 shows the film transport mechanism 28; the reels 24 and 26 are not shown. Mechanism 28 includes an aperture plate 42 coupled to a housing 44 by hinges 46. In FIG. 2, the aperture plate is shown in an open position while the plate is shown in a closed position in FIG. 3. In the closed position, the aperture plate 42 and the housing 44 together with other components cooperate to define a path through the apparatus for the master film 22, which is shown in ghost outline in FIG. 2. Plate 42 and housing 44 are generally referred to as forming a projection "gate". In the position of FIG. 2 the projection gate is said to be open, allowing access to the film and to internal components of the apparatus.

Figure 3:
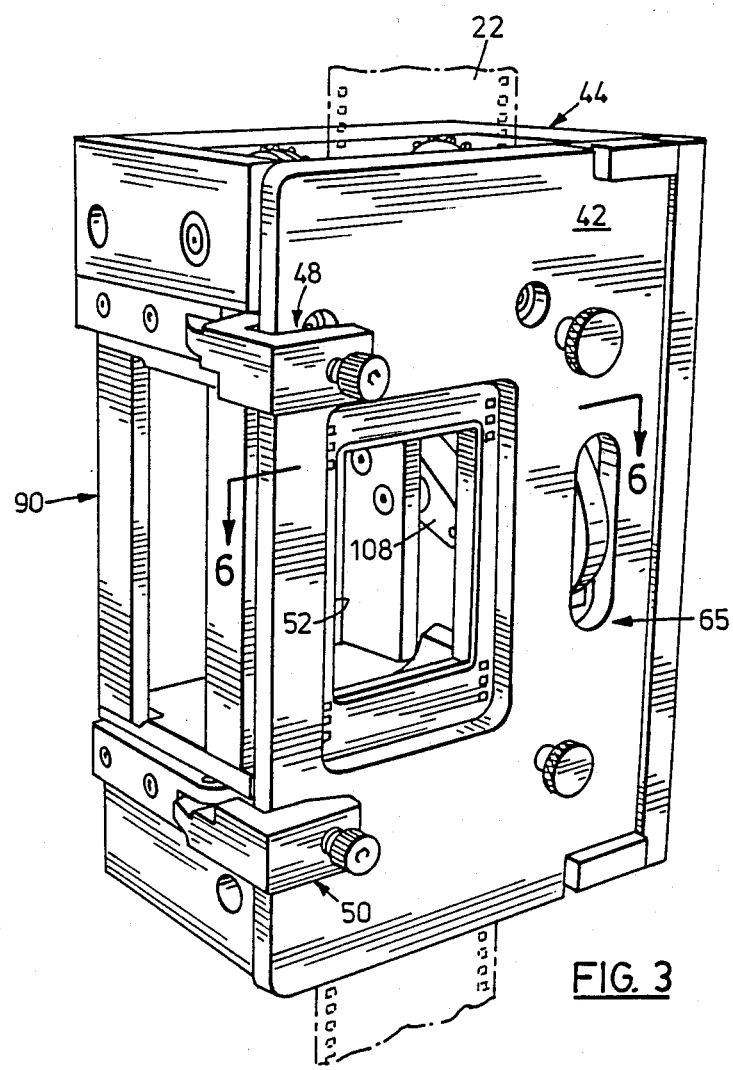
FIG. 3 is a perspective view generally from the same viewpoint as in FIG. 2, with the projection gate closed.

Clamps 48 and 50 are hinged to housing 44 at the opposite side to the aperture plate hinge 46 and can be closed around the outer face of the aperture plate and tightened to hold the film gate closed (the normal operating position of the projection head) as seen in FIG. 3.

Referring back to FIG. 2, a projection aperture in plate 42 is denoted 52 and aligns with a corresponding opening generally indicated at 54 through housing 44 when the projection gate is closed. The inner surface of the aperture plate 42 is machined to define raised surface can be seen, these raised surface portions include parallel vertical strips 56a on opposite sides of the aperture and transverse strips 56b above and below the aperture. Marginal portions of the film 22 outwardly of the frames carrying the images make contact with the vertical strips 56a while portions of the film between successive frames contact the transverse strips 56b.

On opposite sides of the aperture opening 54 through housing 44 are a pressure pad 58 and a blade 60 that form part of the film clamping means of the invention. These components clamp the film against portions of the hardened raised strips 56a of plate 42, on opposite sides of aperture 52. Full details of the clamping means and its relationship with the film advance mechanism of the apparatus will be described later but for present purposes it may be helpful to generally describe the operation of the clamping means.

FIG. 2a shows the pressure pad 58 in side elevation with the projection gate closed. The film 22 is shown unclamped but at the beginning of the clamping operation. The pressure pad 58 and blade 60 are carried by a common face plate 66 (FIG. 2) that is movable towards and away from the aperture plate 42. As shown in FIG. 2a, the face plate 66 has just begun to move towards the film. Upper and lower registration pins 68 and 70 (to be described) have just entered marginal perforations in the film to locate the film laterally with respect to aperture 42 (i.e. in both vertical and horizontal directions).

Pressure pad 58 has a body 72 of foam rubber and a facing 74 of aluminum that frictionally engages the film. It will be seen from FIG. 2a that the pad body 72 is slightly wedge-shaped so that the pad face 74 is inclined slightly to the vertical and therefore makes first contact with the film at its lower end as drawn, close to the full-fitting register pins 70. In point of fact, the inclination of body 72 has been exaggerated somewhat in FIG. 2a for purposes of illustration; in practice, a much shallower angle is used. In any event, it will be appreciated that, as the face plate 66 moves towards the aperture plate 42 pressure pad 58 will press the film back against the aperture plate 42 and will itself be progressively laid onto the film starting from its point of first contact at the lower end of surface 74 and progressing to the top of the pressure pad. Pad 58 clamps the film before blade 60 makes contact.

Figure 7:
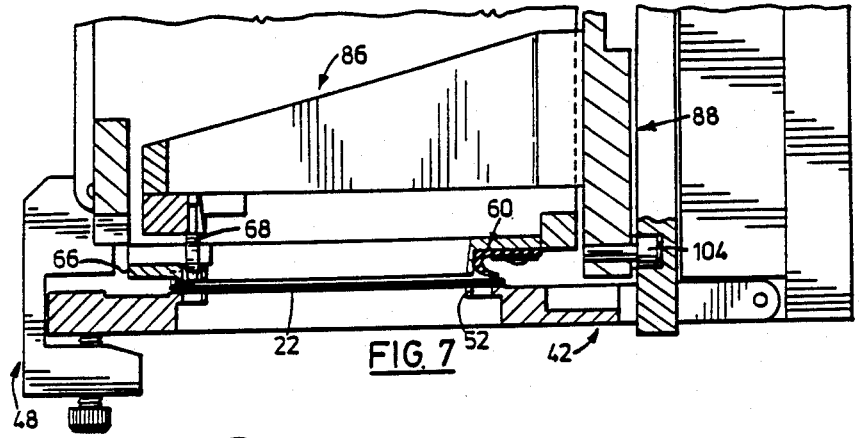
FIG. 7 is a view similar to FIG. 6 but showing the clamping means as having released the film.
Figure 8:
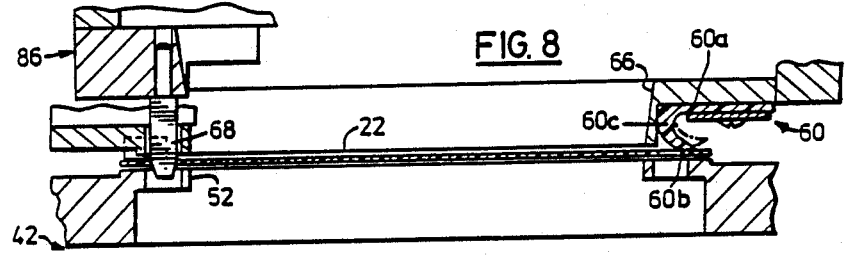
FIG. 8 is a further view similar to FIG. 6 but showing the clamping means in an intermediate position for tensioning the film.

FIG. 8 best shows the cross-sectional shape of blade 60. It will be seen that the blade has a base part 60a by which the blade is clamped to face plate 66, an outer edge 60b that first makes contact with the film and an intermediate arcuate portion 60c that curves outwardly in a direction away from the pressure pad 58. Blade 60 is resilient and, in this embodiment, is made of rubber. The effect of the shaping of blade 60 and its resiliency is that, as face plate 66 moves closer to the aperture plate 42, the arcuate portion of the blade 60 tends to deflect outwardly as indicated in ghost outline in FIG. 8, thereby tensioning the film laterally against the pressure pad 58 and the registration pins 68 and 70. In the fully clamped position shown in FIG. 6, the film is held tightly against the aperture plate 42 and is held flat by the lateral tension applied by blade 60. The film remains clamped in this position during projection; subsequently, the face plate 66 is withdrawn releasing the film as shown in FIG. 7.

Returning now to FIG. 4 various components of the mechanism are shown in exploded positions. The face plate 66 carrying the pressure pad 58 and blade 60 is shown at the righthand side of FIG. 4 and it will be seen that the plate includes raised contact surfaces 76 that surround an opening 78 corresponding to the aperture 52 in plate 42. These surfaces make contact with the film and assist in clamping it to the aperture plate 42, but only at the very limit of the forward travel of the face plate towards aperture plate 42. Soft pads 80 and 82 are carried by the face plate 66 above and below the opening 78. These pads have brush-like surfaces and prevent the film from buckling excessively during movement of the film. Face plate 66 also has clearance openings 84 for the registration pins 68, 70.

The registration pins themselves are carried by a pin frame 86 that can be moved back and forth (towards and away from the film) under the control of a cam 88 as will be described. The face plate 66 itself fits over the registration pin frame 86 and is bolted to a frame 90 which is shown at the extreme left in FIG. 4. Pin frame 86 is in effect received within the face plate frame 90 and the face plate itself is bolted to the front edge of frame 90. Frame 90 in turn is received in an opening 92 in the main housing 44 of the apparatus. Complimentary components of conventional linear ball-race guides are provided between the top of frame 90 and the top surface of the opening 92 in housing 44 and between the bottom of frame 90 and the corresponding surface of housing 44. The race guide components on frame 90 are denoted 94a and 96a respectively while the corresponding components on housing 44 are denoted 94b and 96b. Pin frame 96 is mounted on similar ball-race guides 98 and 100 between frame 86 and housing 44.

In the assembled apparatus, pin frame 86 projects through an opening 102 at the inner side of frame 90 and the opening is dimensioned to provide the required clearance to accommodate relative back and forth movement of pin frame 86 and face plate frame 90 independently of one another.

As discussed previously, back and forth movement of the pin frame 86 is controlled by a cam 88. Cam 88 is driven in rotation about a horizontal axis and has an internal cam track 88a that receives a cam follower 104 on pin frame 86. Cam 88 also has an external cam track or surface 88b on which rides a cam follower 106 carried by an arm 108 fixed externally on the face plate frame 90, as best seen at the lefthand side of FIG. 4. Frame 90 is in fact spring-biassed into its fully forward clamping position by a pair of springs 110 acting between frame 90 and a plate 111 which is fixed to the main housing 44 but shown remote from the housing in FIG. 4. As follower 106 rides on the external surface of cam 88, frame 90 is moved against the effect of its spring-biassing. In the fully forward position of the face plate 66 follower 106 in fact stands clear of cam 88 so that the face plate clamps the film solely under the affect of the biassing of springs 110.

Figure 9:
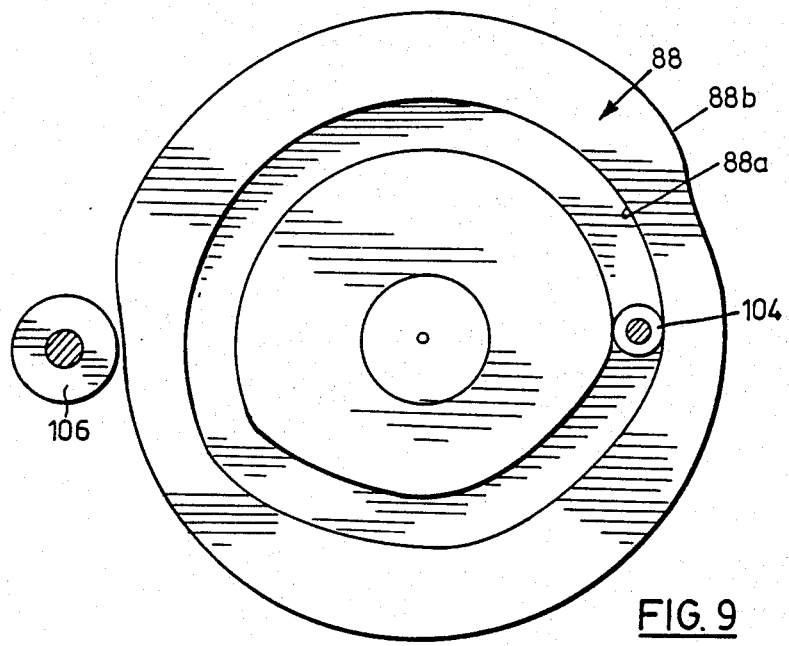
FIG. 9 illustrates a cam arrangement used to actuate the film clamping means.

FIG. 9 shows cam 88 positioned as it would be in the film clamping position; that is, with both the registration pins 68 and 70 and the face plate 66 in their fully forward clamping positions. Follower 106 stands clear of the cam as discussed previously. The fact that the clamping device is spring-biassed allows for some tolerance in manufacturing the components of the mechanism.

The registration pins 68 and 70 are essentially of conventional form. The lower pins 70 are full fitting; the upper pins 68 fit the perforations laterally. This allows for minor inaccuracies in spacing of the perforations, for example due to shrinkage of the film.

In the illustrated embodiment, the film transport mechanism is designed to advance the film upwardly through the projector head. The film is advanced by a pair of sprockets at the top of the mechanism that engage the perforations in the respective side margins of the film and draw the film upwardly in intermittent steps. FIG. 2 shows the two sprockets at 112 and 114. The film is guided laterally by four edge guides, all denoted 116, carried by housing 44. These guides are eccentric cylinders which can be adjusted about respective central axes to adjust the path of the film. Clearance recesses for those edge guides are visible at 118 at the inner surface of the aperture plate 42. Immediately adjacent each clearance recess is a machined pad 120 that makes contact with a defined spot on housing 44 when the projector gate is closed to accurately define the gap between aperture plate 42 and housing 44 through which the film passes.

Figure 5:
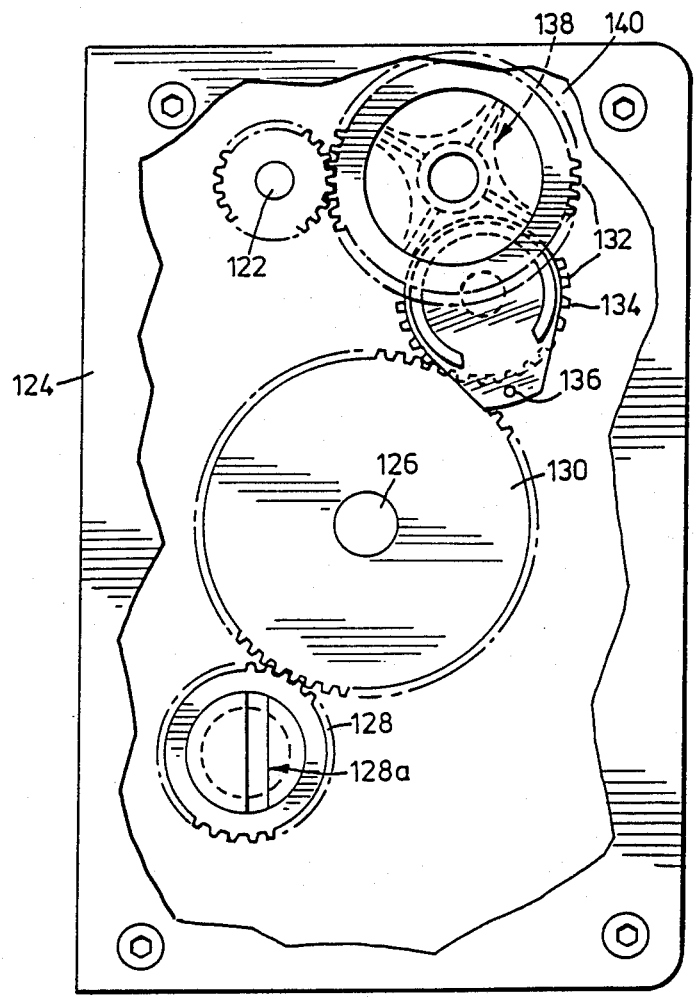
FIG. 5 is a side view generally in the direction of arrow 5 in FIG. 4 and shows the gear drive arrangement for the film transfer apparatus.
Figure 4:
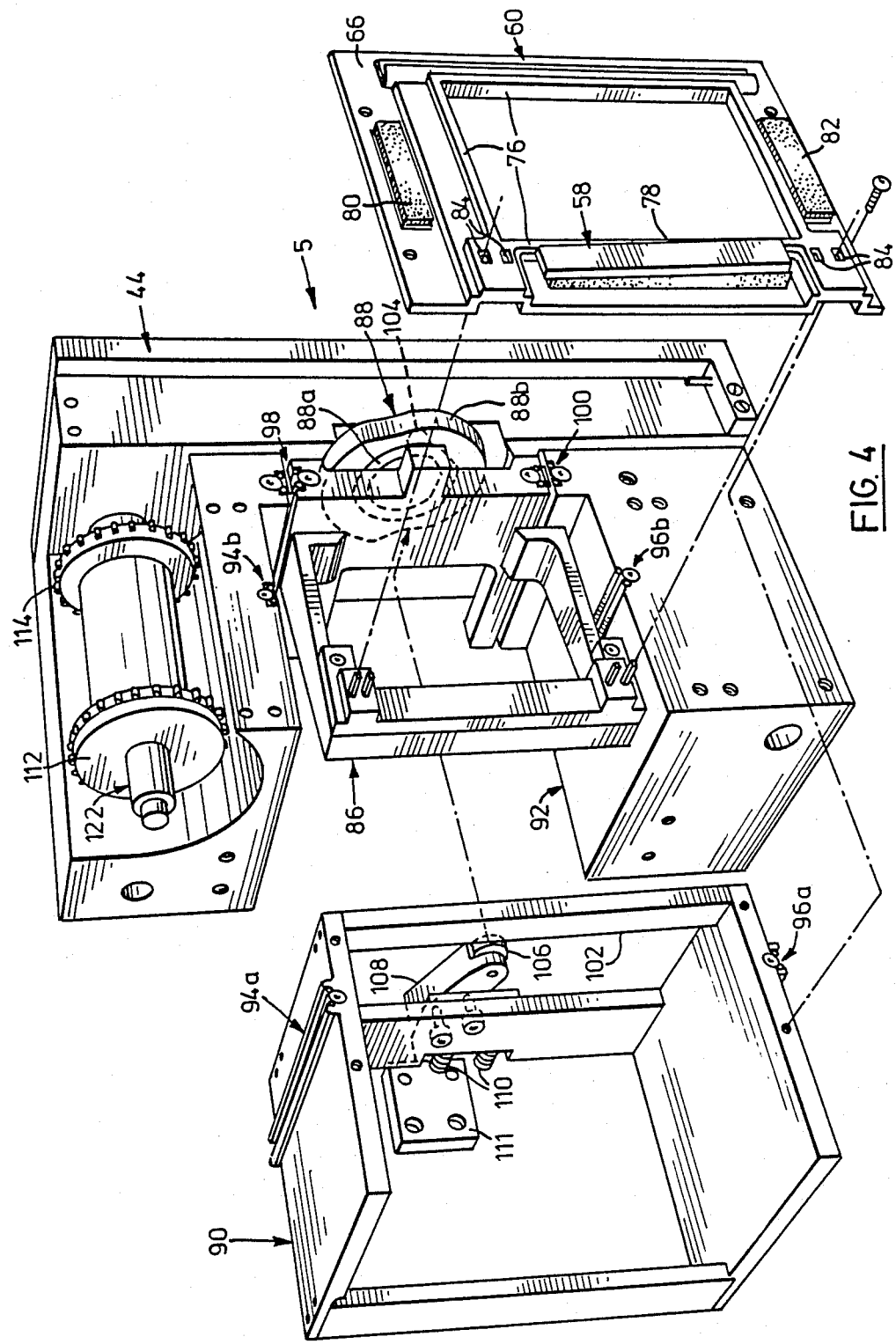
FIG. 4 is an exploded perspective view of certain of the principal components of the projection head.

As best seen in FIG. 4, the two film advance sprockets 112 and 114 in fact form part of a common sprocket assembly on a shaft 122 journalled for rotation in housing 44. An end plate of the housing has been removed in FIG. 4 for clarity of illustration. At the righthand, outer face of housing 44 as seen in FIG. 4, shaft 122 and cam 88 are connected by a drive transmission shown in FIG. 5. The drive transmission is in fact enclosed by a coverplate 124 but that plate has been broken away to show internal details. The sprocket shaft 122 is visible at the top lefthand side of the transmission while the shaft that carries cam 88 is shown just below the centre and is denoted 126. A drive shaft from an external drive motor (not shown) is coupled to a first gear 128 that meshes with a gear 130 on the cam drive shaft 126. Part of an offset slot drive coupling arrangement between sprocket 128 and the external drive shaft is shown at 128a.

Figure 10:
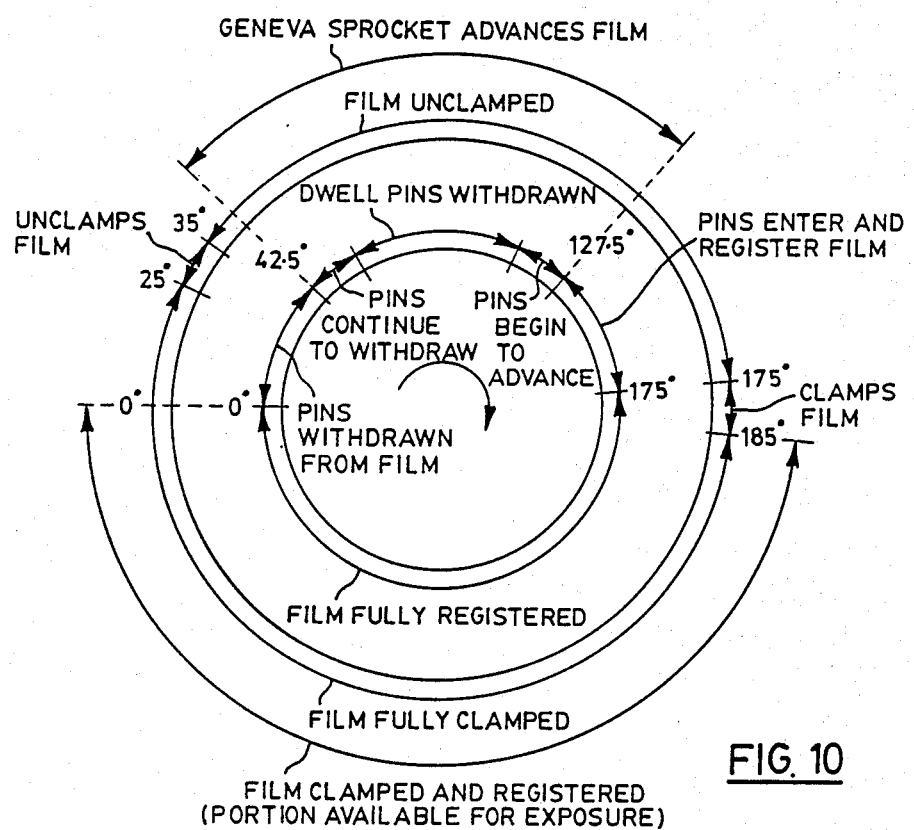
FIG. 10 is a timing diagram for the cam arrangement shown in FIG. 9.

The sprocket drive shaft 122 is driven intermittently from gear wheel 130 by a conventional Geneva cam arrangement generally denoted 132. This arrangement includes a first gear wheel 134 that meshes with gear wheel 130 and carries a pin 136 of the Geneva mechanism. For each revolution of gear wheel 134, pin 136 engages and turns a Geneva cam wheel 138 through less than a full turn (90° typically). A further gear wheel 140 is coupled to the Geneva cam wheel and meshes with a gear 142 on sprocket shaft 122. Thus, the sprocket wheels 112, 114 (FIG. 4) are intermittently turned in timed relation with the turning of the main cam 88. In this way, advance of the film by the sprocket wheels 112, 114 is synchronized with back and forward movement of both the film registrations pins 68 and 70 and the film clamping arrangement represented by the face plate 66 and the pressure pad 58 and blade 60 carried thereby. FIG. 10 is phase diagram that illustrates the relationship between these movements for each revolution of cam 88.

Figure 6:
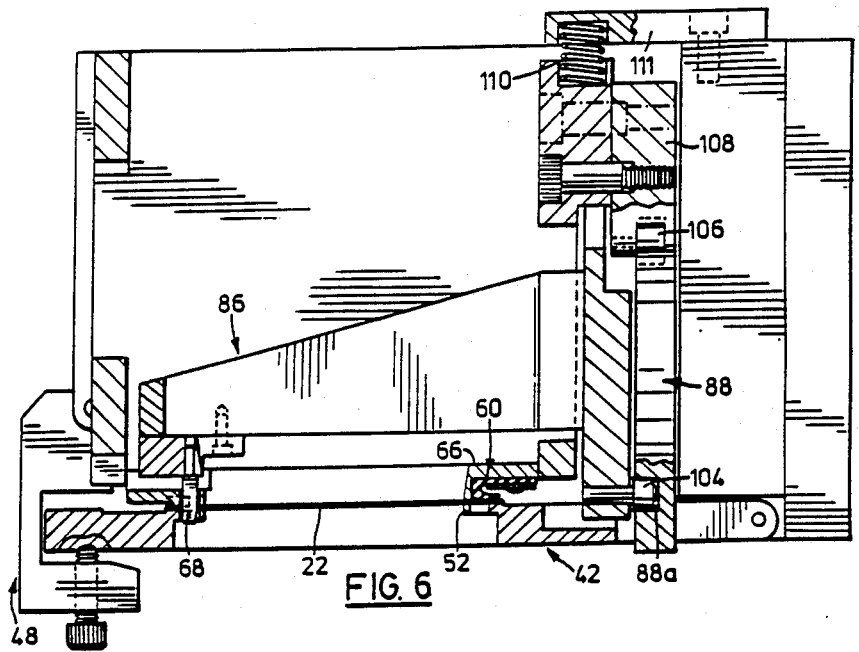
FIG. 6 is a horizontal sectional view on line 6—6 of FIG. 3, showing film clamping means holding the film in the clamped position.

FIGS. 6 and 7 show the film respectively in the clamped and unclamped positions, while FIG. 8 shows the mechanism moving towards the clamped position of the film. In FIG. 6, the film is shown positively located at one margin by the registration pins 68 and 70 and pressure pad 58, with the film having been tensioned laterally towards the opposite margin by the blade 60. Starting from the zero position in the phase diagram of FIG. 10 cam 88 begins to move the pin frame 86 away from the film, withdrawing the registration pins. At the same time, the face plate frame 90 is moved away from the film by the edge surface on cam 88 co-operating with follower 106 so that face plate 66 and, with it, pressure pad 58 and blade 60 also begin to release the film. After between 25° and 30° of movement (FIG. 10) the film is unclamped and by 42.5° the registration pins have cleared the film. The Geneva mechanism then begins to advance the film while the pins continue to withdraw. Film advance continues until approximately 127.5° of movement has taken place. The registration pins are in a "dwell" condition during between 60° and 115° of movement. The pins then begin to advance and engage the film. By the 175° position, the pins have entered and registered the film. The pressure pad and blade then engage the film and the pressure pad continues to move towards the film as the film is laterally tensioned by the blade 60. The film is fully clamped and registered by 185°. For the remainder of the cycle from that time until the mechanism returns to the zero position the film is fully clamped and registered. All of this time is then available for exposure of the film through the aperture.

Figure 11:
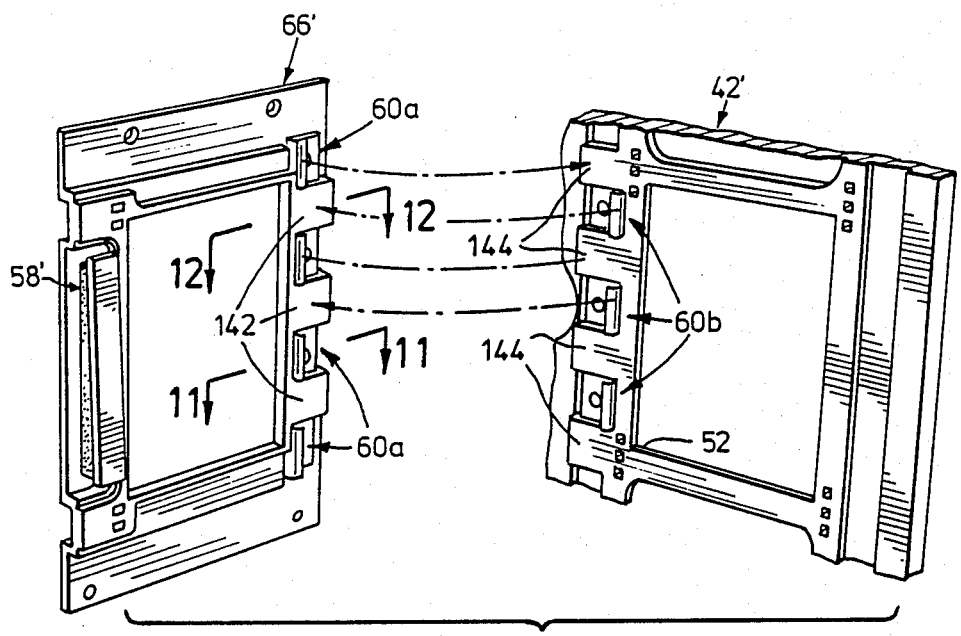
FIG. 11 is a view generally similar to part of FIG. 2 but showing an alternative embodiment of the invention.
Figure 12:
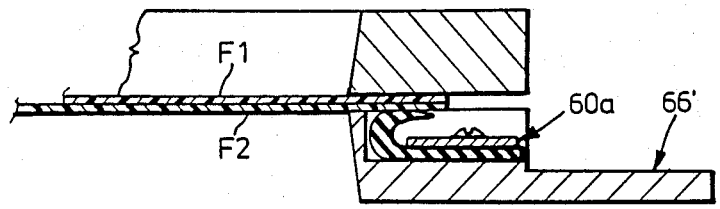
FIGS. 12 and 13 are horizontal sectional views generally on lines 12—12 and 13—13 of FIG. 11.
Figure 13:
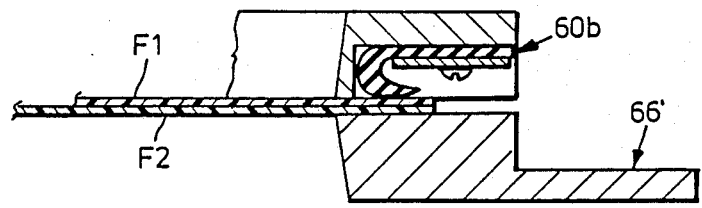

FIGS. 11, 12 and 13 illustrate a further embodiment of the invention intended for use where two films or one film and a mask are to be transported in contact with one another. The two films are denoted $F_1$ and $F_2$ in FIGS. 12 and 13 and will be advanced together through the mechanism in the same way as described previously for one film. Other components shown in FIGS. 11 to 13 that correspond with parts shown in previous views are denoted by primed reference numerals.

Essentially, the face plate of the clamping mechanism (denoted 66' in FIG. 11) and the aperture plate, denoted 42' are modified for use with two films. The remainder of the apparatus is unchanged. Pressure pad 58' is also essentially the same as in the preceding embodiment. However, instead of a single film engaging blade 60 carried only by the face plate of the clamping mechanism as in the preceding embodiment, in FIG. 11, both the face plate 66' and the aperture plate 42' carry a series of short blades spaced from one another and arranged in staggered relationship so that, when the aperture plate 42' is closed, one set of blades can be accommodated between the other set without interfering with one another. The blades carried by plate 66' are denoted 60a while the blades carried by the aperture plate 42' are denoted 60b. Between the blades 60a are pads 144 that provide a backing against which the blades 60b on plate 42' can react. Similar pads between and outwardly of the blade 60b are denoted 144 and provide reaction surfaces for the blades 60a. The pads 142 and 144 are formed integrally as pads of the respective plates 66, 42. In this particular embodiment, four blades are provided on the face plate 66' and three on the aperture plate 42'; however, this is not essential.

The individual blades 60a, 60b are of identical cross-sectional shape to the blade 60 described previously and are merely of shorter length. The blades act on the respective films in essentially the same fashion as blade 60 as can be appreciated from FIGS. 12 and 13. Both of the films $F_1$, $F_2$ will in this way be tensioned against the clamping effect of the pressure pad 58' and against the registration pins 68, 70.

Figure 14:
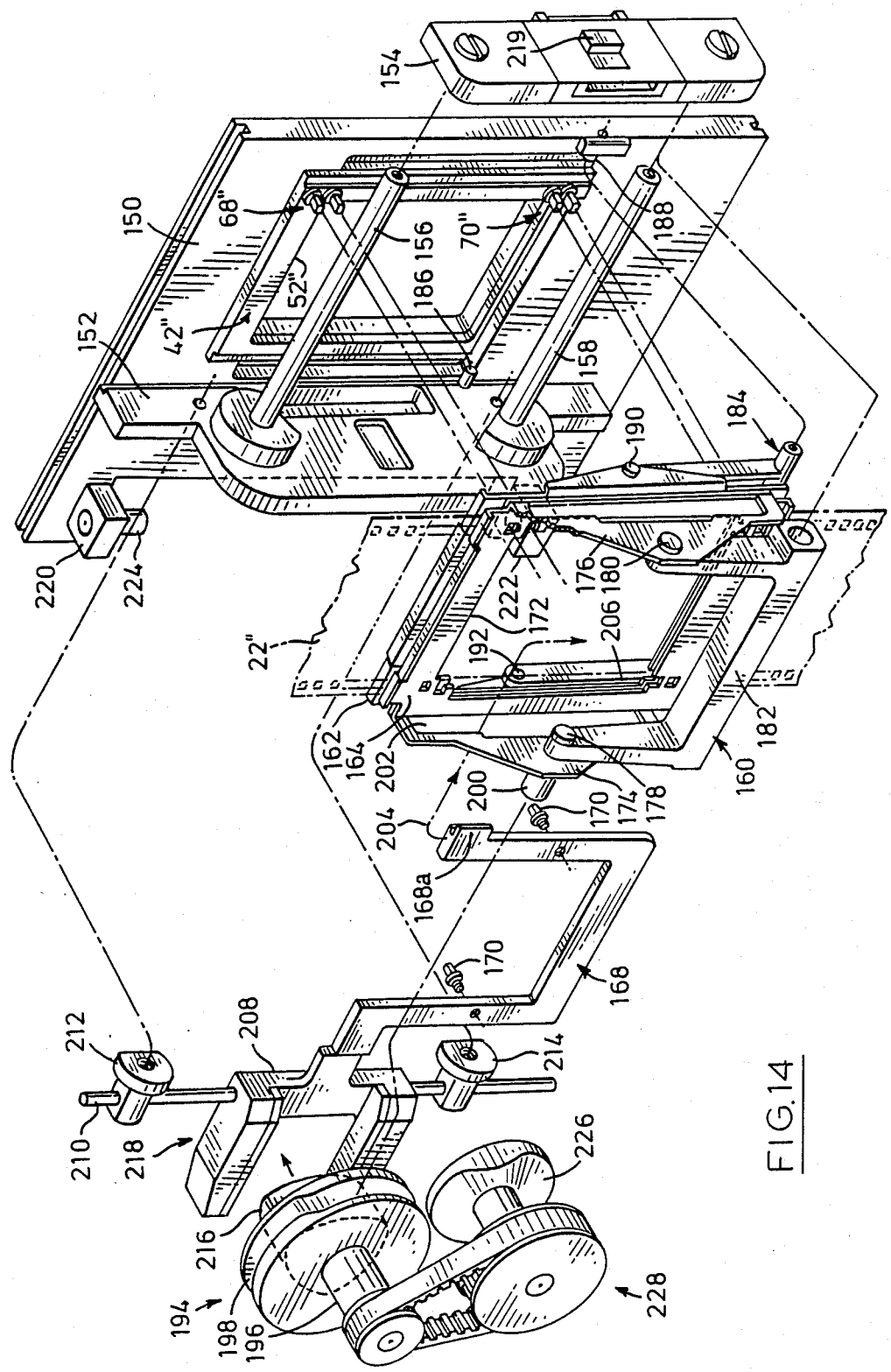
FIGS. 14 and 15 are perspective views showing respectively a shuttle-type film advance mechanism and film clamping means forming part of a film transport apparatus in accordance with a further embodiment of the invention, the mechanism of FIG. 14 being shown partly exploded.
Figure 15:
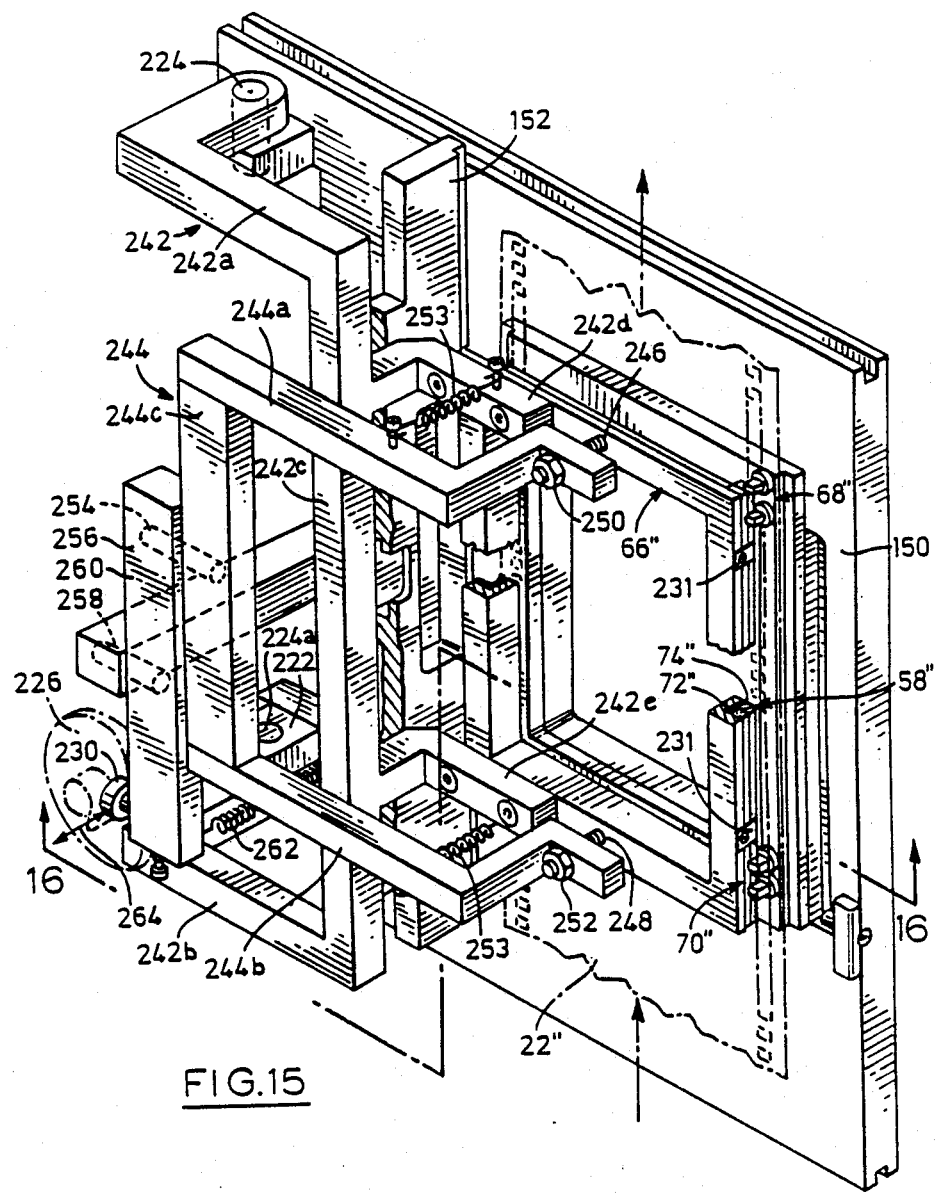

Reference will now be made to FIGS. 14 to 18 in describing a further preferred embodiment of the invention, illustrating the use of film clamping means in association with a shuttle-type film advance mechanism. The film advance mechanism is shown in FIG. 14 but most of the clamping means has been omitted for clarity of illustration; the clamping means itself is shown in FIG. 15.

Double primed reference numerals have been used in FIGS. 15 to 18 to denote parts that correspond with parts shown in previous views.

Referring first to FIG. 14, an aperture plate 42" having an aperture 52" is shown supported on a base plate 150. Upper and lower registration pins 68" and 70" extend outwardly from aperture plate 42" generally as in the first embodiment. The lower registration pins 70" are full-fitting pins whereas the upper pins 68" are half-height pins but full width, as described previously.

Extending outwardly from base plate 150 on opposite sides of the aperture plate 42" are two side plates 152 and 154, the latter one of which is shown in an exploded position. When assembled, the two side plates are joined by upper and lower circular section rods 156 and 158, the lower one of which acts as a pivot pin for a film guide assembly generally denoted by reference numeral 160. Assembly 160 includes inner and outer film guide plates 162 and 164 which co-operate to define a path therebetween for the film (shown in ghost outline at 22"). As the mechanism operates, assembly 160 pivots back and forth as will be described to alternately lift the film off the registration pins 68", 70" and return the film back onto the pins as each frame is advanced. Film advance is undertaken by a generally U-shaped film transport member 168 which is reciprocated vertically relative to the film guide assembly as will be described and which carries a pair of film transfer pins 170.

Referring back to the film guide assembly 160, the two guide plates 162 and 164 of course have rectangular central apertures through which the film can be exposed; the aperture for plate 164 is denoted 172. With continued reference to plate 164 by way of example, a pair of brackets 174 and 176 extend outwardly from opposite sides of the plate and are pivoted respectively at 178 and 180 to a pair of upright arms forming part of a U-shaped bracket 182. Bracket 182 is in turn pivotally mounted on the lower rod 158 of the two rods that connect the two side plates 152 and 154 of the apparatus. The other guide plate 162 is supported in similar fashion by a corresponding bracket that is generally indicated at 184. That bracket is supported on a pair of pins denoted 186 and 188 that are disposed generally parallel to and inwardly of rod 158. Bracket 184 is pivoted to the inner guide plate 162 by pivot pins that are visible at 190 and 192.

In summary, each of the brackets 182 and 184 defines a lower pivot axis about which the bracket itself is supported, and an upper pivot axis at which the bracket is coupled to the relevant guide plate 162 and 164. These four pivot axes are arranged to define what is in effect a parallel arm linkage that maintains the guideplates 162, 164 in planes that are parallel to the plane containing the inner surface of the aperture plate 42" as the film guide assembly reciprocates back and forth towards and away from the aperture plate. When the mechanism is stationary, the outer guide plate 164 can also be pivoted downwardly about the axis defined by rod 158 to provide access to the film if necessary (e.g. for film loading).

Reciprocation of the film guide assembly 160 towards and away from the aperture plate 42 is derived from a rotary cam 194 that is continuously driven from a main drive shaft 196 of the apparatus. Cam 194 has a profiled surface 198 that co-operates with a follower pin 200 formed by an outward extension of the pivot 178 between the two brackets 182 and 174.

In the assembled film advance mechanism, the film transport member 168 extends through a slot 202 in the support bracket 174 for the outer guide plate 164 as indicated by the arrow 204. Clearance recesses are provided in the sides of the guide plates 162, 164 to accommodate the transfer pins 170 and permit their vertical reciprocation. The recesses at one side of the frame are visible in FIG. 14 and are denoted 206.

Member 168 is supported at its outer side by a bracket 208 that is pivotally supported on a vertical shaft 210. Shaft 210 is in turn supported adjacent its upper and lower ends in a pair of guide members 212 and 214 that are bolted to the outer face of the side member 152 in the assembled mechanism. The guides 212 and 214 permit turning of shaft 210 to accommodate opening of the outer guide plate 164 about rod 158 for providing access to the film as described previously. In addition, the guides allow vertical reciprocation of shaft 210 for advancing the film. This vertical reciprocation is derived from a further cam 216 that is carried on shaft 196 adjacent cam 198 and that co-operates with a fork-shaped cam follower 218 carried by bracket 208. By virtue of the co-operation between follower 218 and cam 216, the transfer pins 170 are of course driven positively in both vertical directions. Member 168 is normally prevented from movement towards and away from aperture plate 42" by engagement of a tab 168a with a latch (not shown) carried by side plate 154. A release tab for the latch is visible at 219.

At each film advance step, the film guide assembly 160 moves away from the aperture plate 42", releasing the film from the register pin 68" and 70" and engaging the film with the transfer pins 170. In the illustrated embodiment, the film moves vertically upwards. Accordingly, the transfer pins 170 then move up to advance the film an appropriate increment, at the end of which, the film guide assembly 160 moves back towards the aperture plate and lifts the film from the pins 170 and onto the register pins 68", 70". The transfer pins 170 then return downwardly to begin the next stroke. In this particular embodiment, the stroke of the transfer pins is such that three reciprocatory motions are required to move the film by one frame.

As noted previously, details of film clamping means of the invention have been omitted from FIG. 14 for clarity of illustration. However, FIG. 14 does show some parts of the clamping arrangement. Specifically, upper and lower mounting blocks 220 and 222 are shown outwardly of the side plate 152 and carry co-axial sub-shafts, one of which is visible at 224. The clamping mechanism is driven from the same drive shaft 196 as the film advance mechanism and FIG. 14 shows at 226 a driving cam for the clamping mechanism that is driven by a ribbed belt and pulley drive 228 from shaft 196. The drive arrangement provides a 3:1 drive ratio so that the film is clamped after every third film advance step. The clamping mechanism acts on the film through the opening (as opening 172) in the film guide assembly 160.

Reference will now be made to FIG. 15 in describing the clamping mechanism. In that view, the two blocks 220 and 222 are visible as is stub-shaft 224, the corresponding stub-shaft carried by block 222 (denoted 224a) and side plate 152. Part of cam 226 is also shown in ghost outline in co-operation with a cam follower 230 that drives the clamping mechanism.

FIG. 16 is a sectional view on the stepped section line denoted 16—16 in FIG. 15. It will be seen from FIG. 16 that the clamping mechanism includes a pressure pad 58" and a blade 60" at respectively opposite sides of the aperture in aperture plate 42". The pad and blade are essentially the same as the blade and pressure pad described previously (see FIGS. 2 and 2a) except that pad 58" does not have an inclined outer face. Also, locating tabs 231 are provided outwardly of pad 58" (see FIGS. 15, 16 and 17). Pad 58" and blade 60" are carried by a plate that is in principle very similar to the face plate 66 of the first embodiment. In FIGS. 15 to 18, the corresponding plate is denoted by reference numeral 66". The plate may carry pads at the top and bottom of the aperture similar to pads 80 and 82 described previously. However, as can be seen from FIG. 18, in this case, plate 66" has plain flat surfaces 230, 232 along the top and bottom edges of the aperture. Blade 60" and pressure pad 58" are substantially co-extensive with the side edges of the aperture. As can be seen from FIGS. 16 and 17, the blade and pressure pad are located in respective recesses 234 and 236 that open into the outer edges of plate 66". Narrow plain faces 238 and 240 remain inwardly of the pressure pad and blade respectively for final clamping of the film after the film has been flattened by the pressure pad and blade.

It can be seen from FIGS. 16 and 17 that the face plate or pressure plate 66" is supported by a cranked bracket 242 for movement about a fixed pivot axis defined by stub-shafts 224 and 224a. Bracket 242 in fact has upper and lower limbs 242a and 242b respectively that are pivoted on the respective stub-shafts and joined to one another by a cross bar 242c from which extend angle portions 242d and e that are bolted to the pressure plate 66" adjacent its upper and lower ends respectively. In this way, the pressure plate is firmly supported for pivotal movement on the stub-shafts 224 and 224a.

Movement of the pressure plate 66" towards the aperture plate for clamping the film is effected by a generally U-shaped frame that is denoted 244 in FIG. 15. Frame 244 has two cranked limbs 244a and 244b that bear against the top and bottom margins of the pressure plate 66" respectively by way of threaded rods 246 and 248 that are received in complimentarily screw-threaded bores in the limbs and provided with lock nuts 250 and 252 respectively. This arrangement permits precise adjustment to ensure that equal pressure is applied at both contact points with plate 66". A pair of tension springs 253 maintain frame 66" in contact with the outer ends of the threaded rods 246, 248.

At their inner ends, the two limbs 244a and 244b are joined by a cross bar 244c. This cross bar is in turn coupled by a pivot pin 254 to one end of an actuating arm 256 that carries the cam follower 230 adjacent is opposite end. At its centre, arm 256 is coupled by further pivot pin 258 to a fixed arm 260 that is bolted to the base plate 150 of the apparatus. A spring 262 coupled to arm 256 holds the cam follower 230 in contact with a face cam surface on cam 226. This spring also acts to lift the pressure plate 66" off the film when the film is being advanced.

The surface of cam 226 is profiled so that, as the cam rotates, the follower 230 will move in and out as indicated by arrow 264 in synchronism with the operation of the film advance mechanism shown in FIG. 14. After each film advance step when the film is to be clamped against the aperture plate, cam 226 will move follower 230 in the outward direction (generally to the left in FIG. 15). This will cause arm 256 to pivot outwardly at its lower end about pivot pin 258 so that the upper end of the arm will move inwardly and carry with it frame 244, pressing the pressure plate 66" against the aperture plate 42". Conversely, when the film is to be unclamped, the cam profile will allow follower 228 to move in the opposite direction under the influence of spring 262, releasing pressure on plate 66" and allowing the plate to move away from the film.

Pressure plate 66" is appropriately contoured (not shown) to clear the registration pins 68" and 70".

FIG. 16 shows the clamping mechanism in the fully clamped position with plate 66" firmly holding the film against the aperture plate 42". FIG. 17 on the other hand, shows the unclamped condition. In that view, the film guide assembly 160 is shown as having moved away from the aperture plate as indicated by the arrows denoted 266, for permitting the film to be advanced. Subsequent movement of the pressure plate 66" towards the aperature plate 42" under the influence of movement of frame 244 to reclamp the film will return the mechanism to the position shown in FIG. 16.

As the pressure plate 66" approaches the film, pressure pad 58" contacts the film first so that the relevant edge of the film is clamped against the aperture plate. Immediately thereafter, continued movement of plate 66" towards the aperture plate causes the blade 60" to engage the opposite edge of the film and stretch the film laterally across the aperture generally as described in connection with the preceding embodiments. The plate finally returns to the fully clamped position shown in FIG. 16.

It will of course be appreciated that the preceding description relates to particular preferred embodiments of the invention only and that many modifications are possible. In the preferred embodiments, the first and second film engaging means of the invention take the form of a resilient blade and a resilient pressure pad respectively. However, it should be noted that other forms of film engaging means may be used. For example, it may be possible to use two oppositely acting resilient blades that would tension the film against one another. Another possibility would be for one resilient blade to tension the film against the registration pins. In other words, the registration pins themselves would form the "second film engaging means". Broadly, the "first film engaging means" may be constituted in any appropriate form that results in progressive tensioning of the film cross the aperture.

While the film transport apparatus has been described in the environment of an optical printer, there is no limitation in this respect. As indicated previously, the apparatus could be used in a projector, camera or other film processing or handling equipment.

Preferably, the apparatus provided by the invention will include at least one registration pin adjacent the pressure pad for assuring precise registration of the film with the aperture. However, in some cases, it may be possible to assure registration in other ways, for example, by the film advance mechanism. In another embodiment the film could be advanced by pins that would engage in perforations in the film, advance in the direction of required film movement and hold the film in registration with the aperture, before retracting, returning and re-engaging the film for performing another film advance step. In other words, the pins could serve the dual function of advancing the film and assuring registration.

The pressure plate and blade or blades are shown in the drawings as being on opposite sides of the film and extending generally parallel to the direction of film movement. While it is believed that these positions will generally be preferred, it is conceivable that the pressure plate and blade or blades could extend transversely of the film above and below the film aperture, for example if the film was very narrow but had a high frame height.

Referring specifically to the embodiment of FIGS. 14 to 19, it will of course be understood that the film clamping mechanism (FIG. 15) may be actuated independently of but in synchronism with the film advance mechanism (FIG. 14). For example, solenoid actuation of the film clamping mechanism is feasible.

I claim:

1. Film transport apparatus comprising:
   a stationary aperture plate against which successive portions of a film are to be located for registration of frames on the film with an aperture in the plate;
   film advance means for engaging and intermittently advancing the film in steps to bring successive said frames into registration with the aperture, the film remaining stationary between steps; and,
   film clamping means arranged to hold the stationary film against the aperture plate between each film advance step, and including a resilient pressure pad for engaging a portion of the film at a first side of each successive frame outwardly of the aperture, to clamp that portion of the film against the aperture plate, a resilient blade extending generally parallel to said pressure pad for engaging the film at a second side of the same frame outwardly of the aperture, and means supporting said resilient pressure pad and blade for progressive movement from a position clear of the film to a film clamping position, said blade including a portion of arcuate shape in cross-section that terminates in an outer edge for initial frictional engagement with the film, said arcuate portion curving towards said edge in a direction away from the pressure pad so that continued movement of the blade towards the film clamping position from initial engagement of the film by the blade progressively tensions the film between the pressure pad and blade.

2. An apparatus as claimed in claim 1, wherein said means supporting the pad and blade comprise a pressure plate having an opening that matches said aperture, the pad and blade being coupled to said plate on respectively opposite sides of the opening therein, and means for moving the pressure plate towards and away from the aperture plate to respectively clamp and unclamp a film.

3. An apparatus as claimed in claim 1, further comprising film registration means including at least one registration pin engageable in a marginal perforation in the film, and means for moving said pin between a retracted position clear of the film for permitting advance of the film and an engaged position in which the pin is closely received in a said perforation for assuring proper registration of the film with said aperture, said pin being disposed at the same side of the film as the said pressure pad so that the film is retained at said side by both the pressure pad and the pin, permitting the blade to tension the film in a direction away from said pad and pin.

4. An apparatus as claimed in claim 3, further comprising at least two said registration pins spaced along the film at the same side of the film as the pressure pad, and wherein said means for moving the registration pins comprise a support carrying said pins and means for moving said support towards and away from the film in synchronism with movement of said pressure pad and blade.

5. An apparatus as claimed in claim 4, wherein said means for moving the pin support comprises a cam having a first cam track co-operating with a follower carried by said pin support, and means for continuously driving said cam in rotation to cause the pin support to reciprocate towards and away from the film in accordance with a predetermined profile of said track, and wherein said means supporting the pressure pad and blade comprise a support separate from said pin support and having a follower engaging a second track on said cam, whereby movement of both said supports is controlled by the same cam.

6. An apparatus as claimed in claim 5, wherein said pressure pad and blade support is spring-biassed to said film clamping position, and wherein said follower and second cam track co-operate to move the support against its spring-biassing in accordance with a predetermined profile of said second cam track.

7. An apparatus as claimed in claim 5, wherein said film advance means comprises a pair of sprockets engageable with perforations in opposite margins of the film, and intermittent drive means coupled between said cam and said sprockets for intermittently rotating the sprockets in synchronism with rotation of the cam.

8. An apparatus as claimed in claim 1, wherein said pressure pad has an outer face for engagement with the film and wherein said face is inclined to a plane containing the film so that the pad initially engages the film at one end of said face.

9. An apparatus as claimed in claim 1, wherein said pressure pad and blade are disposed on respectively opposite sides of the film generally parallel to the direction of film travel, and extend over a length approximating the length of a frame on said film.

10. An apparatus as claimed in claim 1, wherein said blade comprises a rubber strip of uniform cross-sectional shape throughout its length.

11. An apparatus as claimed in claim 1, wherein said resilient blade comprises one of a first series of said blades, the blades in said series being disposed in alignment with but spaced from one another over a length approximating the length of a frame on said film, and wherein a second similar series of blades is provided on said aperture plate, the blades in the respective series being offset with respect to one another so that the blades one series fit between the blades in the other series, and wherein there is provided between each pair of adjacent blades a support surface against which a blade in the other series can react, whereby two superposed films can be clamped and laterally tensioned by said blades.

12. An apparatus as claimed in claim 1, wherein said film advance means comprises a shuttle assembly including a film transport member which carries at least one pin engageable in a marginal perforation in the film, means for reciprocating said member in the direction of film travel, and means for engaging said pin with a said marginal perforation in the film during movement of the film transport member in a direction to advance the film, and for disengaging the pin and film to permit return movement of said member clear of the film.

13. An apparatus as claimed in claim 12, further comprising film registration means including at least one fixed registration pin extending outwardly from said aperture plate and engageable in a marginal perforation in the film, wherein said shuttle assembly includes a film guide assembly movable towards and away from the aperture plate to respectively engage and disengage said film and registration pin, and wherein the film transport member is reciprocable with respect to said film guide assembly, said at least one pin carried by the film transport member comprising a transfer pin with which the film is engaged by the film guide assembly after disengagement from said registration pin, and from which the film is disengaged for re-engagement with said registration pin after film advancing movement of the film transport member.

14. An apparatus as claimed in claim 13, wherein said film guide assembly comprises inner and outer guide plates defining therebetween a film path along which the film is advanced, said inner and outer plates including respective openings that match said aperture in the aperture plate, and wherein said film transport member is carried by said film guide assembly and moves with respect to the outer film guide plate.

15. An apparatus as claimed in claim 14, wherein said means supporting the pad and blade comprise a pressure plate having an opening that matches said aperture, the pad and blade being coupled to said plate on respectively opposite sides of the opening therein, and means for moving the pressure plate towards and away from the aperture plate to respectively clamp and unclamp a film, and wherein said means for moving the pressure plate towards and away from the aperture plate comprise spring means biassing the pressure plate away from the aperture plate, and means for pressing the pressure plate towards the aperture plate against its said spring biassing.

16. An apparatus as claimed in claim 15, wherein said means for moving the pressure plate towards the aperture plate comprise a bracket supported for pivotal movement about an axis disposed laterally of said aperture and means for moving the bracket about its said axis to press the pressure plate towards the aperture plate.

17. In a film transport apparatus comprising a stationary aperture plate against which successive portions of a film are to be located for registration of frames on the film with an aperture in the plate, and film advance means for engaging and intermittently advancing the film in steps to bring successive frames into registration with the aperture, the film remaining stationary between said steps;

the improvement comprising film clamping means arranged to hold the stationary film against the aperture plate between each film advance step, and including a resilient pressure pad for engaging a portion of the film at a first side of each successive frame outwardly of the aperture, to clamp that portion of the film against the aperture plate, a resilient bladed extending generally parallel to said pressure pad for engaging the film at a second side of the same frame outwardly of the aperture, and means supporting said resilient pressure pad and blade for progressive movement from a position clear of the film to a film clamping position, said blade including a portion of arcuate shape in cross-section that terminates in an outer edge for initial frictional engagement with the film, said arcuate portion curving towards said edge in a direction away from the pressure pad so that continued movement of the blade towards the film clamping position initial engagement of the film by the blade progressively tensions the film between the pressure pad and blade.

* * * * *